(12) United States Patent
Murugesan et al.

(10) Patent No.: US 9,703,705 B2
(45) Date of Patent: Jul. 11, 2017

(54) PERFORMING EFFICIENT CACHE INVALIDATION

(71) Applicant: Google Inc., Mountain View, CA (US)

(72) Inventors: Vijayakumar Murugesan, San Jose, CA (US); Vedant Bhangale, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/282,865

(22) Filed: Sep. 30, 2016

(65) Prior Publication Data

US 2017/0024319 A1 Jan. 26, 2017

Related U.S. Application Data

(63) Continuation of application No. 14/717,860, filed on May 20, 2015, now Pat. No. 9,489,306.

(51) Int. Cl.

| | | |
|---|---|---|
| *G06F 12/00* | (2006.01) | |
| *G06F 12/0808* | (2016.01) | |
| *G06F 12/0815* | (2016.01) | |
| *G06F 12/0891* | (2016.01) | |
| *G06F 12/0831* | (2016.01) | |
| *G06F 12/0802* | (2016.01) | |
| *G06F 12/128* | (2016.01) | |

(52) U.S. Cl.
CPC ...... *G06F 12/0808* (2013.01); *G06F 12/0802* (2013.01); *G06F 12/0815* (2013.01); *G06F 12/0833* (2013.01); *G06F 12/0891* (2013.01); *G06F 12/128* (2013.01); *G06F 2212/1032* (2013.01); *G06F 2212/621* (2013.01); *G06F 2212/683* (2013.01); *G06F 2212/69* (2013.01)

(58) Field of Classification Search
CPC ............ G06F 12/0802; G06F 12/0808; G06F 12/0815; G06F 12/0833; G06F 12/0891; G06F 2212/1032; G06F 2212/683; G06F 2212/69

See application file for complete search history.

(56) References Cited

U.S. PATENT DOCUMENTS

2011/0047411 A1* 2/2011 Gille ..................... G06F 11/073
714/723

\* cited by examiner

*Primary Examiner* — Shawn X Gu
(74) *Attorney, Agent, or Firm* — Fish & Richardson P.C.

(57) ABSTRACT

Performing cache invalidation is disclosed, including: receiving an invalidation request to invalidate one or more invalidated cache entries at a cache storage; determining whether an invalidation pattern included in the invalidation request matches an invalidation pattern associated with an existing invalidation entry of an invalidation data structure; in the event that the invalidation pattern included in the invalidation request matches the invalidation pattern associated with the existing invalidation entry of the invalidation data structure, updating the existing invalidation entry with an invalidation timestamp included in the invalidation request, and in the event that the invalidation pattern included in the invalidation request does not match invalidation patterns associated with existing invalidation entries of the invalidation data structure, generating a new invalidation entry in the invalidation data structure with the invalidation pattern and the invalidation timestamp included in the invalidation request.

21 Claims, 9 Drawing Sheets

| Key | Value | Creation Timestamp | TTL |
|---|---|---|---|
| a1 | <a1_value> | 1:00 AM | 3 hours |
| a2 | <a2_value> | 1:05 AM | 5 hours |
| a3-k5 | <a3-k5_value> | 2:43 AM | 1 hour |
| b6 | <b6_value> | 6:10 AM | 5 hours |
| x2 | <x2_value> | 6:46 AM | 3 hours |
| y8 | <y8_value> | 7:23 AM | 5 hours |
| v1 | <v1_value> | 7:55 AM | 3 hours |
| v2-k1 | <v2-k1_value> | 8:15 AM | 5 hours |
| v2-k2 | <v2-k2_value> | 8:48 AM | 4 hours |
| v2-k3 | <v2-k3_value> | 9:05 AM | 3 hours |

FIG. 6

| Key Pattern | Invalidation Timestamp 1 | Invalidation Timestamp 2 | Invalidation Timestamp 3 |
|---|---|---|---|
| a1 | 2:00 AM | 3:30 AM | 6:30 AM |
| x2 | 7:00 AM | 7:30 AM | N/A |
| v1 | 8:00 AM | N/A | N/A |
| v2 | 9:00 AM | N/A | N/A |

FIG. 7

PERFORMING EFFICIENT CACHE INVALIDATION

CROSS REFERENCE TO OTHER APPLICATIONS

This application is a continuation of co-pending U.S. patent application Ser. No. 14/717,860, now U.S. Pat. No. 9,489,306 entitled PERFORMING EFFICIENT CACHE INVALIDATION filed May 20, 2015 which is incorporated herein by reference for all purposes.

BACKGROUND OF THE INVENTION

Data that may be subsequently requested can be cached for faster access. Cached data may be invalidated from a cache in response to a manually initiated invalidation request. However, a cache may include a large number of entries and it could therefore be costly to search through the cache to indicate each cache entry that is to be invalidated by an invalidation request.

BRIEF DESCRIPTION OF THE DRAWINGS

Various embodiments of the invention are disclosed in the following detailed description and the accompanying drawings.

FIG. 6 is a diagram showing examples of cache entries that are stored at a cache storage.

FIG. 7 is a diagram showing examples of invalidation entries that are stored in an invalidation data structure.

DETAILED DESCRIPTION

Figure 1:
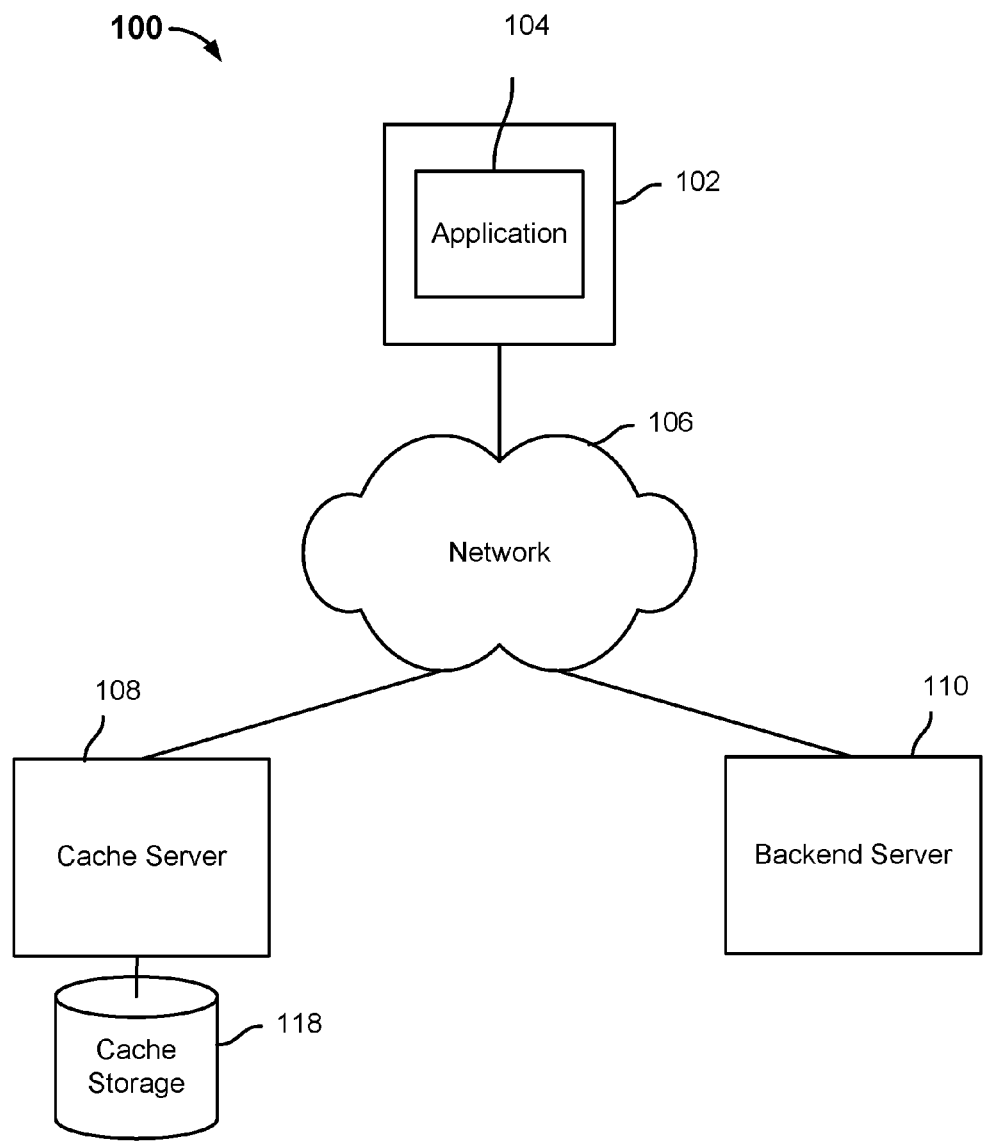
FIG. 1 is a diagram showing an embodiment of a system for performing efficient cache invalidation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of performing efficient cache invalidation are described. In various embodiments, a cache storage stores cached data as entries, where each cache entry includes at least a key-value pair and also a time at which the entry was created in the cache storage. In various embodiments, the key of the key-value pair in a cache entry comprises at least a portion of a data retrieval request and the value of the key-value pair in the cache entry comprises at least a portion of a response from a backend server to the data retrieval request. An invalidation request to invalidate one or more cache entries of the cache storage is received. The invalidation request is stored in an invalidation data structure. In some embodiments, an "invalidation data structure" stores data associated with invalidation requests. For example, an invalidation request describes an invalidation pattern associated with keys of cache entries that are to be invalidated and a time at which the invalidation is to occur. In some embodiments, the invalidation data structure is stored in the same storage as the cache. In some embodiments, the invalidation data structure is stored in a different storage and one that permits faster accesses than the cache. Prior to removing the one or more invalidated cache entries from the cache storage, a data retrieval request for a requested cache entry from the cache storage is received. The invalidation data structure is used to determine whether the requested cache entry has been invalidated. An invalidated cache entry may comprise outdated data, expired data, or data that is otherwise determined to be no longer permitted to be retrieved from the cache storage. In the event that the requested cache entry has not been invalidated, then the data that is requested by the data retrieval request is retrieved directly from the cache storage. Otherwise, in the event that the requested cache entry has been invalidated, then the data that is requested by the data retrieval request is directed to another data source (e.g., the data source from which the requested cache entry was originally obtained).

FIG. 1 is a diagram showing an embodiment of a system for performing efficient cache invalidation. In the example, system 100 includes device 102, network 106, cache server 108, cache storage 118, and backend server 110. Network 106 may comprise high-speed data networks and/or telecommunications networks.

Application 104 is executing on device 102. Examples of device 102 may include a desktop computer, a laptop computer, a mobile device, a smart phone, a tablet device, and any other type of computing device. Based on a user's interaction (e.g., selection(s), input(s)) with application 104, application 104 is configured to generate a data retrieval request (e.g., an application programming interface (API)

request) to access desired data. The API request is sent over network 106 to cache server 108. Cache server 108 comprises an API management server that receives API requests from applications and retrieves the data required to respond to each API request by sending requests to one or more of backend server 110 and/or a third party service server (not shown in the diagram). Backend server 110 may comprise a server that stores data associated with the application. Backend server 110 comprises a collection of services and systems behind an API proxy, such as cache server 108. Cache server 108 serves as a front end for the backend systems and handles incoming API requests, processes them before sending the requests to the backend server for further processing. Similarly, backend servers respond to API requests sent by cache server 108 with responses. These responses are sent to cache server 108, which in turn, sends the responses to the requesting application. For example, application 104 may have been developed by a party that is associated with the party that operates backend server 110 and/or a third-party developer who makes use of publicly available services.

For example, backend server 110 is associated with a company that wishes to expose its backend services on the web so that the services can be consumed by applications (e.g., such as application 104) and/or desktops. For example, the company might want to expose services that provide product pricing and availability information, sales and ordering services, order tracking services, and any other services required by applications. For example, companies often expose services as a set of hypertext transfer protocol (HTTP) endpoints. Application developers then make API requests (e.g., HTTP requests) to these endpoints. Depending on the endpoint, the service might then return data, formatted as XML or JSON, back to the requesting application. Because cache server 108 acts as an API proxy for backend server 110, developers of applications such as application 104 do not need to know about the implementation of services provided by backend server 110. Furthermore, since cache server 108 acts as an API proxy for backend server 110, cache server 108 isolates developers of applications such as application 104 from the services provided by backend server 110 and so the implementation of a service provided by backend server 110 may change as long as the public API remains consistent. Examples of changes to the service implementation include a database implementation and a migration of the service to a new host.

Cache server 108 is configured to cache data obtained from backend sever 110 and/or a third party service server in cache storage 118 based on stored caching policies. In various embodiments, cache server 108 is configured to store cached data in cache storage 118 as cache entries, each with at least a key-value pair and a time at which the cache entry was created (which is also sometimes referred to as a "creation timestamp"). In some embodiments, the key of the key-value pair in a cache entry comprises at least a portion of an API request and the value of the key-value pair in the cache entry comprises at least a portion of a response from a backend server to the API request. The type of data associated with the keys and corresponding values in cache storage 118 may vary depending on the configuration of backend server 110. For example, the key may comprise a HTTP request uniform resource identifier (URI) and the corresponding value may comprise a JSON response or a binary value. For example, such caching policies include default caching policies, parameters configured by cache server 108, and/or configurations submitted by an application developer associated with an application.

Cache server 108 is configured to receive an invalidation request to invalidate one or more cache entries stored at cache storage 118. In some embodiments, the invalidation request is received from backend server 110 or a device associated with a developer of application 104. For example, the invalidation request is generated at backend server 110 or a device associated with a developer of application 104 in response to a manual input by a user. For example, the invalidation request may be generated in response to a user input to invalidate certain cached entries prior to the expiration of a previously configured retention period. For example, the reason that prompted the generation of the invalidation request may be that data stored at backend server 110 has changed such that the response (e.g., that comprises a value of a key-value pair) for a given API request (e.g., that comprises the key of the key-value pair) will be different compared to what was previously cached. An invalidation request includes an invalidation pattern that can be used to identify one or more cache entries stored at cache storage 118 to invalidate and also a time at which the invalidation is to occur. In some embodiments, the invalidation pattern included in an invalidation request is configured to match the key portion of the key-value pairs corresponding to cache entries to invalidate. In some embodiments, the invalidation pattern included in an invalidation request is configured to match the value portion of the key-value pairs corresponding to cache entries to invalidate. In some embodiments, the invalidation pattern included in an invalidation request is configured to match the creation timestamps of the key-value pairs corresponding to cache entries to invalidate. Cache server 108 is configured to store the invalidation request in a stored invalidation data structure. In some embodiments, the invalidation data structure is stored at cache storage 118. In some embodiments, the invalidation data structure is stored at a storage that is different from and enables faster access than cache storage 118. For example, the invalidation data structure is stored in a memory of cache server 108, whereas cache storage 118 comprises a hard disk storage, which allows the invalidation data structure to be searched faster than cache storage 118.

By storing the invalidation request in the invalidation data structure, cache server 108 can invalidate one or more cache entries stored in cache storage 118 that are identified by the invalidation request without searching through cache storage 118 to find and mark those cache entries identified by the invalidation request as being invalidated. Put another way, cache entries of cache storage 118 can be invalidated by simply storing data in the invalidation data structure, instead searching through the potentially numerous entries of cache storage 118 to find the invalidated cache entries and marking them as being invalidated.

In some embodiments, the invalidated cache entries stored at cache storage 118 are not immediately removed from cache storage 118. Instead, the cache entries stored at cache storage 118 that are invalidated by virtue of data stored in the invalidation data structure are removed from cache storage over time by an asynchronous process or a thread that is invoked periodically or in response to a triggering event.

As will be described in further detail below, cache server 108 is configured to determine whether a requested cache entry associated with a data retrieval request (e.g., an API request) received from application 104 executing at device 102 is invalidated at cache storage 118 using the invalidation data structure. In the event that the requested cache entry has not been invalidated, cache server 108 is configured to retrieve the requested cache entry associated with the data retrieval request directly from cache storage 118. Otherwise, in the event that the requested cache entry has been invalidated, cache server 108 is configured to forward the data retrieval request to another data source (e.g., backend server 110 or a third party service server) from which data associated with the requested cache entry was originally obtained.

Figure 2:
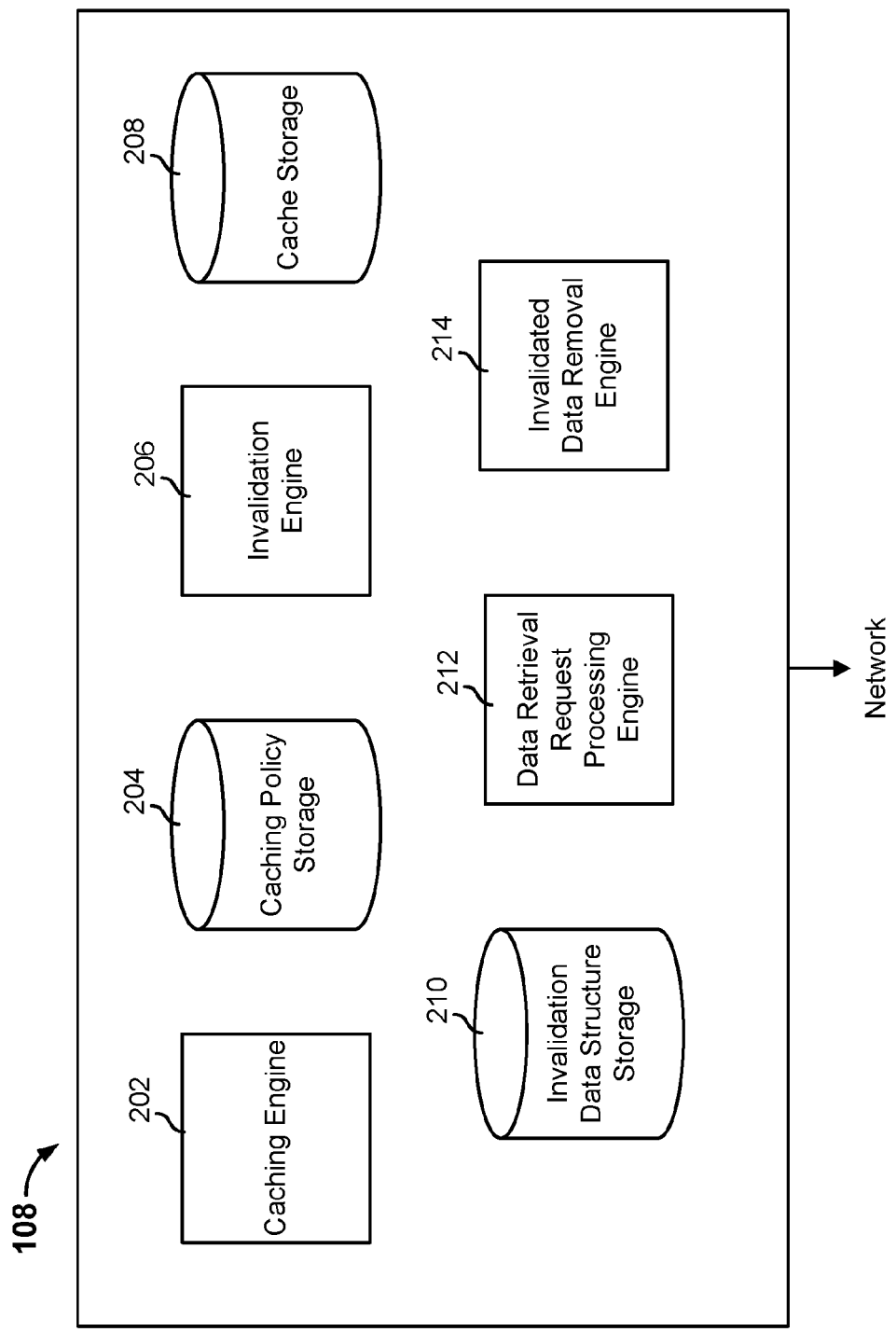
FIG. 2 is a diagram showing an embodiment of a cache server.

FIG. 2 is a diagram showing an embodiment of a cache server. In some embodiments, cache server 108 and cache storage 118 of system 100 of FIG. 1 are implemented using the example cache server of FIG. 2. In the example of FIG. 2, the cache server includes caching engine 202, caching policy storage 204, invalidation engine 206, cache storage 208, invalidation data structure storage 210, data retrieval request processing engine 212, and invalidated data removal engine 214. Each of caching engine 202, invalidation engine 206, data retrieval request processing engine 212, and invalidated data removal engine 214 can be implemented using hardware, software, or a combination of hardware and software.

Caching engine 202 is configured to store data that was obtained from a data source (e.g., a backend server or a third party service server) in cache storage 208 based on an associated caching policy that is stored at caching policy storage 204. In various embodiments, the data to be stored at cache storage 208 is obtained by data retrieval request processing engine 212 in response to a data retrieval request that is received at the cache server. In some embodiments, data retrieval request processing engine 212 is configured to determine whether the requested data associated with the data retrieval request is already stored in cache storage 208. In the event that the requested data associated with the data retrieval request is not already stored in cache storage 208, data retrieval request processing engine 212 is configured to obtain the requested data from the data source (e.g., a backend server or a third party service server). The requested data that is obtained from the data source is then stored by caching engine 202 as one or more cache entries at cache storage 208 using an associated caching policy that is stored at caching policy storage 204. In various embodiments, a cache entry stored at cache storage 208 comprises a key-value pair and a creation timestamp that indicates when the cache entry was stored at cache storage by caching engine 202. In some embodiments, caching policies stored at caching policy storage 204 are configured by an application developer, an administrative user associated with a backend server, and/or an administrative user associated with the cache server. In various embodiments, a caching policy determines which type of data (e.g., which key-value pairs among the obtained data) is to be cached and the time period in which to retain such data in a cache storage. The retention period associated with cached data is also sometimes represented by a "time to live" (TTL) period, which indicates a length of time from the creation timestamp that the cached data will remain in the cache storage. In some embodiments, a TTL period is stored with each of the one or more cache entries of cache storage 208. In some embodiments, after the TTL period associated with a cache entry expires, the cache entry is immediately removed from cache storage 208 or can be selectively filtered based on TTL depending upon which kind of cache storage is used. In some embodiments, a cache entry whose corresponding TTL expires is different from an invalidated cache entry because the TTL of the invalidated cache entry could have not yet expired.

As will be described in further detail below, in some embodiments, in response to receiving a data retrieval request, it is first determined whether requested data associated with the data retrieval request is already stored in cache storage 208 and if so, then data retrieval request processing engine 212 is configured to determine whether the requested data associated with the data retrieval request is invalidated based at least in part on checking an invalidation data structure that is stored in invalidation data structure storage 210.

Invalidation engine 206 is configured to receive invalidation requests to invalidate one or more cache entries stored at cache storage 208. In various embodiments, an invalidation request includes an invalidation pattern that comprises any data that can be used to match any portion of cache entries stored at cache storage 208 that are to be invalidated. In various embodiments, an invalidation request further includes an invalidation timestamp that indicates when the invalidation is to take effect. For example, an invalidation pattern included in an invalidation request includes at least a portion of a key and any cache entries associated with keys that include the pattern are to be invalidated by the invalidation request. In various embodiments, an invalidation entry invalidates cache entries that match the invalidation pattern of the invalidation entry and are associated with creation timestamps that are earlier than the invalidation timestamp of the invalidation entry. In various embodiments, an invalidation request is generated in response to a user input or an instruction from a computer program. For example, cached data may be associated with a promotion at a store that is available to a limited quantity of customers but when the limited quantity of customers has been met, the promotion is no longer valid and so an administrative user may submit an input to the backend server associated with the store to generate and send an invalidation request to invalidate the cache entries associated with the promotion. Invalidation engine 206 is configured to store received invalidation requests at invalidation data structure storage 210. In various embodiments, invalidation engine 206 is configured to store received an invalidation request at an invalidation data structure storage 210 as an invalidation entry that includes the invalidation pattern and a timestamp at which the cache entries identified by the pattern are to be invalidated. In some embodiments, in the event that a new invalidation request includes a pattern that is already stored in the invalidation data structure, this invalidation entry in the invalidation data structure is updated with the new invalidation timestamp that is included in the new invalidation request.

In various embodiments, by storing the invalidation request in the invalidation data structure, invalidation engine 206 does not need to find the cache entries in cache storage 208 that are identified by the invalidation request and subsequently mark those cache entries to be invalidated. Given the potentially numerous cache entries that may be stored at cache storage 208, it is likely more efficient for invalidation engine 206 to invalidate cache entries by simply storing a new entry in the invalidation data structure than it would be for invalidation engine 206 to invalidate cache entries by searching through cache storage 208 and marking all the cache entries that are identified by the invalidation request as invalidated.

In some embodiments, invalidation data structure storage 210 comprises a different type of storage than the storage of cache storage 208. In some embodiments, invalidation data structure storage 210 comprises a type of storage that enables faster accesses than the storage of cache storage 208. For example, invalidation data structure storage 210 comprises memory and cache storage 208 comprises hard disk storage. In some embodiments, invalidation data structure storage 210 and cache storage 208 are implemented as a single storage.

Data retrieval request processing engine 212 is configured to receive a data retrieval request (e.g., from an application executing at a device). In various embodiments, data retrieval request identifies a key associated with data that is requested and, in some embodiments, a data source from which to obtain the requested data. In response to receiving the data retrieval request, data retrieval request processing engine 212 is configured to check whether cache storage 208 stores the data requested by the data retrieval request. In the event that data retrieval request processing engine 212 determines that a matching cache entry to the requested data is stored at cache storage 208, then data retrieval request processing engine 212 is configured to determine that a "cache miss" has occurred, forward the data retrieval request to the data source, and not check the invalidation data structure.

Otherwise, in the event that data retrieval request processing engine 212 determines that a matching cache entry to the requested data is stored at cache storage 208, then data retrieval request processing engine 212 is configured to check whether the requested key included in the data retrieval request matches an invalidation entry in the invalidation data structure that is stored at invalidation data structure storage 210. In the event that the key included in the data retrieval request matches an invalidation entry in the invalidation data structure, data retrieval request processing engine 212 is configured to compare the invalidation timestamp of the matching invalidation entry of the invalidation data structure to the creation timestamp of the matching cache entry of cache storage 208 to determine which timestamp is later. If the invalidation timestamp is later, then this indicates that the matching invalidation entry was created after the matching cache entry and that at least one matching cache entry is invalidated. A determination that the matching cache entry is invalidated can be thought of as a "cache miss" and would cause data retrieval request processing engine 212 to forward the data retrieval request to the data source. However, if the creation timestamp is later, then this indicates that the matching invalidation entry was created before the matching cache entry and that the matching cache entry has not been invalidated by the matching invalidation entry and is therefore valid. A determination that the matching cache entry is still valid can be thought of as a "cache hit" and would cause data retrieval request processing engine 212 to return the matching cache entry to the requestor (e.g., the application).

However, in the event that data retrieval request processing engine 212 determines that a matching cache entry to the requested data is stored at cache storage 208 but that the key included in the data retrieval request does not match an invalidation entry in the invalidation data structure, data retrieval request processing engine 212 is configured to determine that a "cache hit" has occurred return the matching cache entry to the requestor (e.g., the application).

Invalidated data removal engine 214 is configured to asynchronously remove the invalidated cache entries from cache storage 208 using the invalidation data structure stored at invalidation data structure 210. In some embodiments, invalidation data removal engine 214 is configured to remove the invalidated cache entries from cache storage 208 at every predetermined time interval or in response to an indication configured to trigger the removal of invalidated data. In various embodiments, invalidation data removal engine 214 is configured to use the invalidation pattern in an invalidation entry stored at the invalidation data structure to identify one or more invalidated cache entries stored at cache storage 208. Invalidation data removal engine 214 is then configured to remove the invalidated cache entries that were identified by the invalidation pattern (e.g., if the invalidation timestamp of the invalidation request has already passed). Once invalidation data removal engine 214 confirms that the identified cache entries have been removed, invalidation data removal engine 214 is configured to remove the invalidation entry from the invalidation data structure. In some embodiments, invalidation data removal engine 214 is configured to repeat this process until every invalidation entry is removed from the invalidation data structure.

Figure 3:
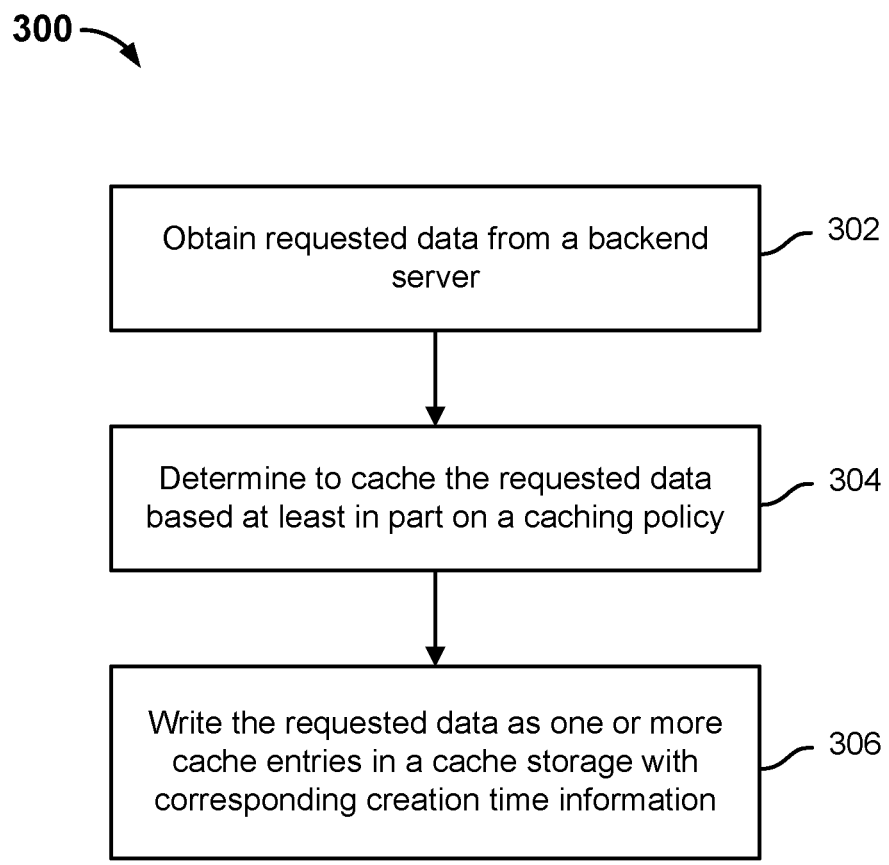
FIG. 3 is a flow diagram showing an embodiment of a process of caching data.

FIG. 3 is a flow diagram showing an embodiment of a process of caching data. In some embodiments, process 300 is implemented at system 100 of FIG. 1. In particular, in some embodiments, process 300 is implemented by cache server 108 of system 100 of FIG. 1.

Process 300 describes an example process by which to store data in a cache storage.

At 302, requested data is obtained from a backend server. In some embodiments, data is requested by a data retrieval request that is sent from an application that is executing at a device. The data retrieval request identifies a key associated with data that is requested. In various embodiments, the data retrieval request was received at a cache server such as cache server 108 of system 100 of FIG. 1. In some embodiments, the requested data was either not stored in a cache storage associated with the cache server and/or was stored in the cache storage but was determined to be invalidated. Because the requested data was not available in the cache storage, the requested data is obtained from a backend server. In some embodiments, the requested data is obtained from a data source other than a backend server, such as, a third party service server, for example. The obtained data for a data retrieval request may comprise one or more values that correspond to the key(s) included in the request.

At 304, the requested data is determined to be cached based at least in part on a caching policy. Whether the requested data that is obtained from the backend server is stored in the cache storage or not, is determined based on an associated caching policy. For example, the associated caching policy may be configured by an administrator associated with the backend server, the application developer, or an administrator user associated with the cache server. In some embodiments, the caching policy determines which type of obtained data should be cached and if so, the TTL of the data in the cache storage.

At 306, the requested data is written as one or more cache entries in a cache storage with corresponding creation time information. In the event that the requested data is determined to be cached based on the associated caching policy, the requested data is written as cache entries in the cache storage, where each cache entry includes at least a key-value pair and the creation timestamp (i.e., the time at which the cache entry was stored at the cache storage). The key portion of a key-value pair represents the key that was included in the data retrieval request and the value portion of the key-value pair represents the requested data that was obtained from the backend server. For example, the key comprises a HTTP request URI and the value comprises a JSON response. In some embodiments, in addition to a key-value pair and a creation timestamp, each cache entry further includes a TTL associated with how long from the creation timestamp the cache entry is to be retained in the cache storage.

Figure 4:
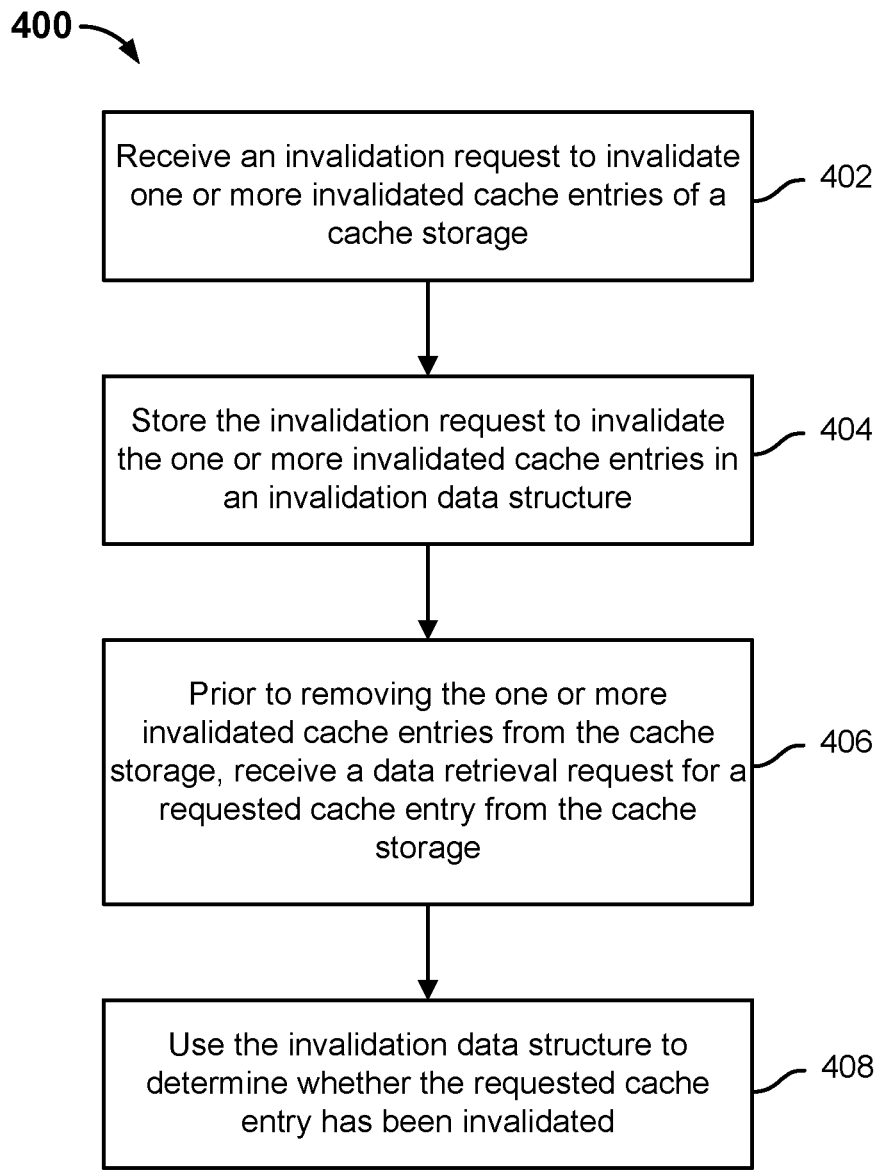
FIG. 4 is a flow diagram showing an embodiment of a process of performing efficient cache invalidation.

FIG. 4 is a flow diagram showing an embodiment of a process of performing efficient cache invalidation. In some embodiments, process 400 is implemented at system 100 of FIG. 1. In particular, in some embodiments, process 400 is implemented by cache server 108 of system 100 of FIG. 1.

At 402, an invalidation request to invalidate one or more invalidated cache entries of a cache storage is received. The invalidation request includes an invalidation pattern that is usable to identify one or more cache entries stored at a cache storage that are to be invalidated. In some embodiments, the invalidation pattern is to be compared to keys of key-value pairs of cache entries and those cache entries whose keys match the pattern, are identified to be invalidated. In some embodiments, in addition to the invalidation pattern, the invalidation request further includes an invalidation timestamp that identifies the time at which the cache entries identified by the pattern are to be considered invalidated. In various embodiments, an invalidation entry invalidates cache entries that match the pattern of the invalidation entry and are associated with creation timestamps that are earlier than the invalidation timestamp of the invalidation entry. In some embodiments, the invalidation timestamp may be associated with when the invalidation request was generated. In some embodiments, the invalidation timestamp may be associated with a time in the future.

At 404, the invalidation request to invalidate the one or more invalidated cache entries is stored in an invalidation data structure. The data associated with the invalidation request is stored as an invalidation entry in an invalidation data structure. In some embodiments, the invalidation data structure comprises a table or other object. In some embodiments, an invalidation entry in the invalidation data structure comprises the invalidation pattern and the invalidation timestamp that were included in the invalidation request.

At 406, prior to removing the one or more invalidated cache entries from the cache storage, a data retrieval request for a requested cache entry from the cache storage is received. The cache entries identified by the invalidation request remain in the cache storage until they are removed by an asynchronous invalidated cache entry removal process or other type of invalidated cache entry removal process. Prior to these cache entries being removed from the cache storage, a data retrieval request is received. The data retrieval request identifies requested data that may be stored in the cache storage but whether the cached data is invalidated or is not depends on the invalidation data structure. In various embodiments, the data retrieval request includes a key that is used to identify the matching cache entries stored at the cache storage and/or the requested data from a data source.

At 408, the invalidation data structure is used to determine whether the requested cache entry has been invalidated. It is first determined whether one or more matching cache entries to the data retrieval request are found in the cache storage. If no matching cache entry to the data retrieval request can be found in the cache storage, then a "cache miss" has occurred and the data retrieval request is forwarded to the data source. But if one or more matching cache entries to the data retrieval request can be found in the cache storage, then the invalidation data structure is checked to determine whether the data requested by the data retrieval request is valid or invalidated in the cache storage. An example of using the invalidation data structure to determine whether the data requested by a data retrieval request is valid or invalidated in the cache storage is described with FIG. 8, below.

Figure 5:
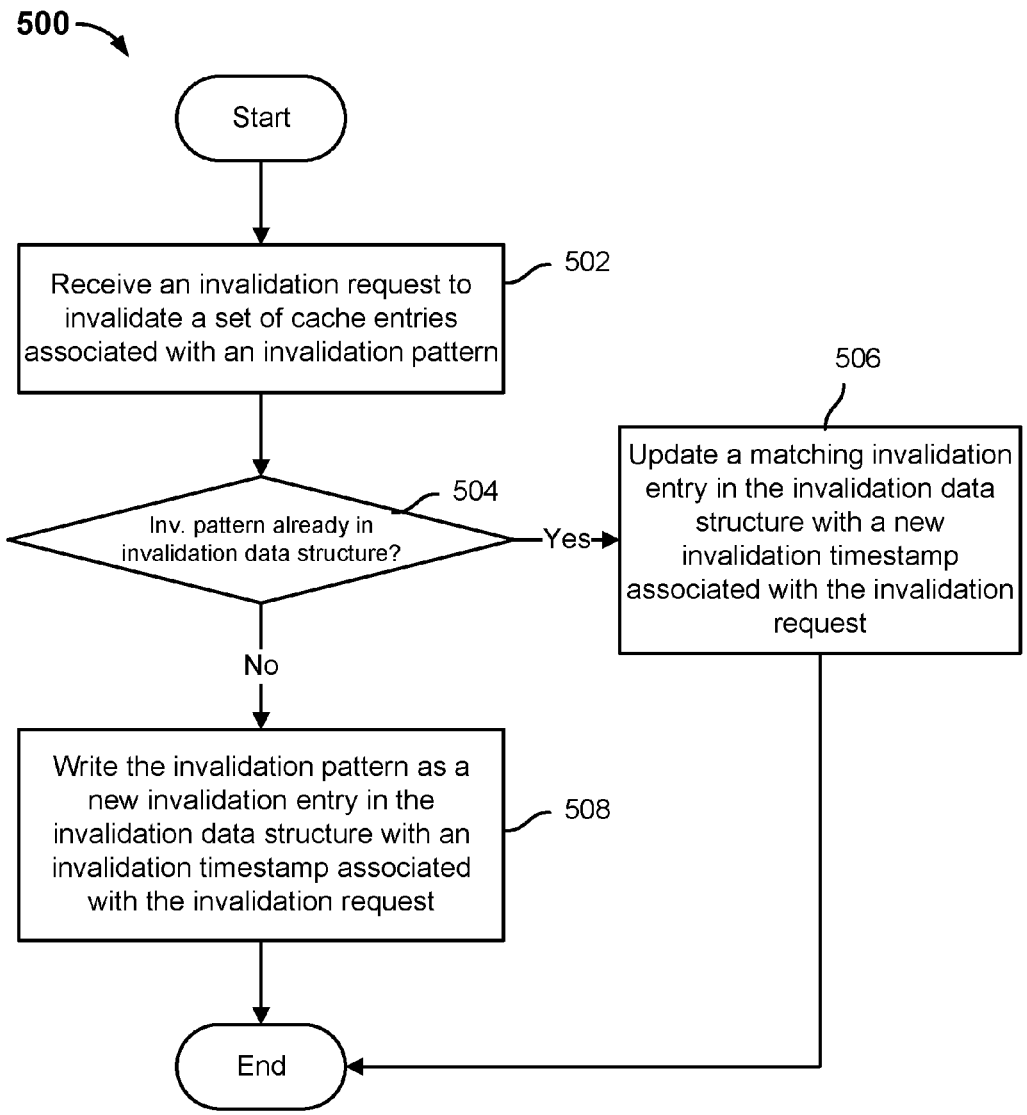
FIG. 5 is a flow diagram showing an embodiment of a process of updating an invalidation data structure.

FIG. 5 is a flow diagram showing an embodiment of a process of updating an invalidation data structure. In some embodiments, process 500 is implemented at system 100 of FIG. 1. In particular, in some embodiments, process 500 is implemented by cache server 108 of system 100 of FIG. 1. In some embodiments, steps 402 and 404 of process 400 of FIG. 4 are implemented, at least in part, using process 500.

Process 500 describes an example process of storing data associated with an invalidation request at an invalidation data structure.

At 502, an invalidation request to invalidate a set of cache entries associated with an invalidation pattern is received. In various embodiments, the invalidation request includes an invalidation pattern that is usable to identify one or more cache entries in a cache storage to invalidate and also an invalidation timestamp associated with when such cache entries are to be considered invalidated and therefore, no longer accessible from the cache storage.

At 504, it is determined whether the invalidation pattern is already found in the invalidation data structure. In the event that the pattern is already found in the invalidation data structure, control is transferred to 506. Otherwise, in the event that the pattern is not already found in the invalidation data structure, control is transferred to 508. The pattern of the invalidation request is compared against the patterns of the existing invalidation entries in the invalidation data structure to determine whether the pattern can be found in an existing invalidation entry.

At 506, a matching invalidation entry in the invalidation data structure is updated with a new invalidation timestamp associated with the invalidation request. In the event that the pattern of the invalidation request can be found in an existing invalidation entry, that existing invalidation entry is determined to be a matching invalidation entry in the invalidation data structure. Due to the existence of the matching invalidation entry, no new invalidation entry needs to be added to the invalidation data structure. Instead, the matching invalidation entry is updated to include a new invalidation timestamp, which is the invalidation timestamp that is included in the invalidation request. For example, the cache entries associated with the same pattern may be stored in the cache storage over time and can be therefore be invalidated at multiple times.

At 508, the pattern is written as a new invalidation entry in the invalidation data structure with an invalidation timestamp associated with the invalidation request. Because there is no matching invalidation entry already in the invalidation data structure, a new invalidation entry is added to the invalidation data structure with the pattern and the invalidation timestamp that are included in the invalidation request.

FIG. 6 is a diagram showing examples of cache entries that are stored at a cache storage. Table 600 shows at least a portion of cache entries that is stored at a cache storage. Each row of table 600 comprises a cache entry. Table 600 includes the following columns: "Key" column 602, "Value" column 604, "Creation Timestamp" column 606, and "TTL" (time to live) column 608. "Key" column 602 stores the key portion of the key-value pair of each cache entry. "Value" column 604 stores the value portion of the key-value pair of each cache entry. "Creation Timestamp" column 606 stores the time at which each cache entry was stored at the cache storage. "TTL" column 608 stores the predetermined length of time that each cache entry is to be retained at the cache storage. In some embodiments, the TTL value of a cache entry is determined by an associated caching policy. In some embodiments, a cache entry whose TTL has expired will disappear from the cache storage, cannot be accessed from the cache storage, and/or is not affected by an invalidation request. In various embodiments, the cache entries of table 600 are created based on data that was obtained from a backend server and/or a third party service server.

In the example of FIG. 6, cache entry 610 comprises key "a1," the value that corresponds to key "a1" that is represented by "a1_value>," the creation timestamp of "1:00 AM," and the TTL value of "3 hours." Cache entry 612 comprises key "a2," the value that corresponds to key "a2" that is represented by "<a2_value>," the creation of "1:05 AM," and the TTL value of "5 hours." Cache entry 614 comprises key "a3-k5," the value that corresponds to key "a3-k5" that is represented by "<a3-k5_value>," the creation timestamp of "2:43 AM," and the TTL value of "1 hour," and so forth.

While the example of FIG. 6 shows that each cache entry is associated with the columns of "Key," "Value," "Creation timestamp," and "TTL," in actual implementation, a cache entry may include more, fewer, and/or different columns.

FIG. 7 is a diagram showing examples of invalidation entries that are stored in an invalidation data structure. Four example invalidation entries are shown in invalidation data structure 700. In various embodiments, the invalidation entries of invalidation data structure 700 are created based on invalidation requests that are received at a cache server. In the example of FIG. 7, the invalidation pattern included in the stored invalidation requests are keys. Each row of invalidation data structure 700 comprises an invalidation entry. Invalidation data structure 700 includes the following columns: "Key Pattern" column 702, "Invalidation Timestamp 1" column 704, "Invalidation Timestamp 2" column 706, and "Invalidation Timestamp 3" column 708. "Key Pattern" column 702 stores the invalidation patterns that are used to match against at least a portion of the keys of cache entries stored in cache storages that are to be invalidated. "Invalidation Timestamp 1" column 704 stores the earliest invalidation timestamp of an invalidation request that is associated with the key pattern of the invalidation entry. "Invalidation Timestamp 2" column 706 stores the second earliest invalidation timestamp of a subsequent invalidation request, if any, that is associated with the key pattern of the invalidation entry. "Invalidation Timestamp 3" column 708 stores the latest invalidation timestamp of a next subsequent invalidation request, if any, that is associated with the key pattern of the invalidation entry. As described above with example process 500 of FIG. 5, when an invalidation request with a new key pattern is received at the cache server, a new invalidation entry can be added to invalidation data structure 700 with the invalidation timestamp included in that invalidation request. When the invalidation request with a key pattern that matches the key pattern of an existing invalidation entry at invalidation data structure 700 is received at the cache server, the existing invalidation entry is updated to add the invalidation timestamp of the invalidation request in the next available invalidation timestamp column.

While the example of FIG. 7 shows that each invalidation entry may be associated with up to three columns of invalidation timestamps, in actual implementation, an invalidation entry may include more or fewer columns of invalidation timestamps.

In the example of FIG. 7, invalidation entry 710 comprises the key pattern of "a1," the invalidation timestamp 1 of "2:00 AM," the invalidation timestamp 2 of "3:30 AM," and the invalidation timestamp 3 of "6:30 AM." As such, it can be seen from the example of FIG. 7 that three invalidation requests that included the key pattern of "a1" were received at the cache server; the first invalidation request was associated with the invalidation timestamp of "2:00 AM," the second invalidation request was associated with the invalidation timestamp of "3:30 AM," and the third invalidation request was associated with the invalidation timestamp of "6:30 AM." Invalidation entry 712 comprises the key pattern of "x2" and the invalidation timestamp 1 of "7:00 AM." As such, it can be seen from the example of FIG. 7 that two invalidation requests that included the key pattern of "x2" were received at the cache server; the first invalidation request was associated with the invalidation timestamp of "7:00 AM" and the second invalidation request was associated with the invalidation timestamp of "7:30 AM."

Figure 8:
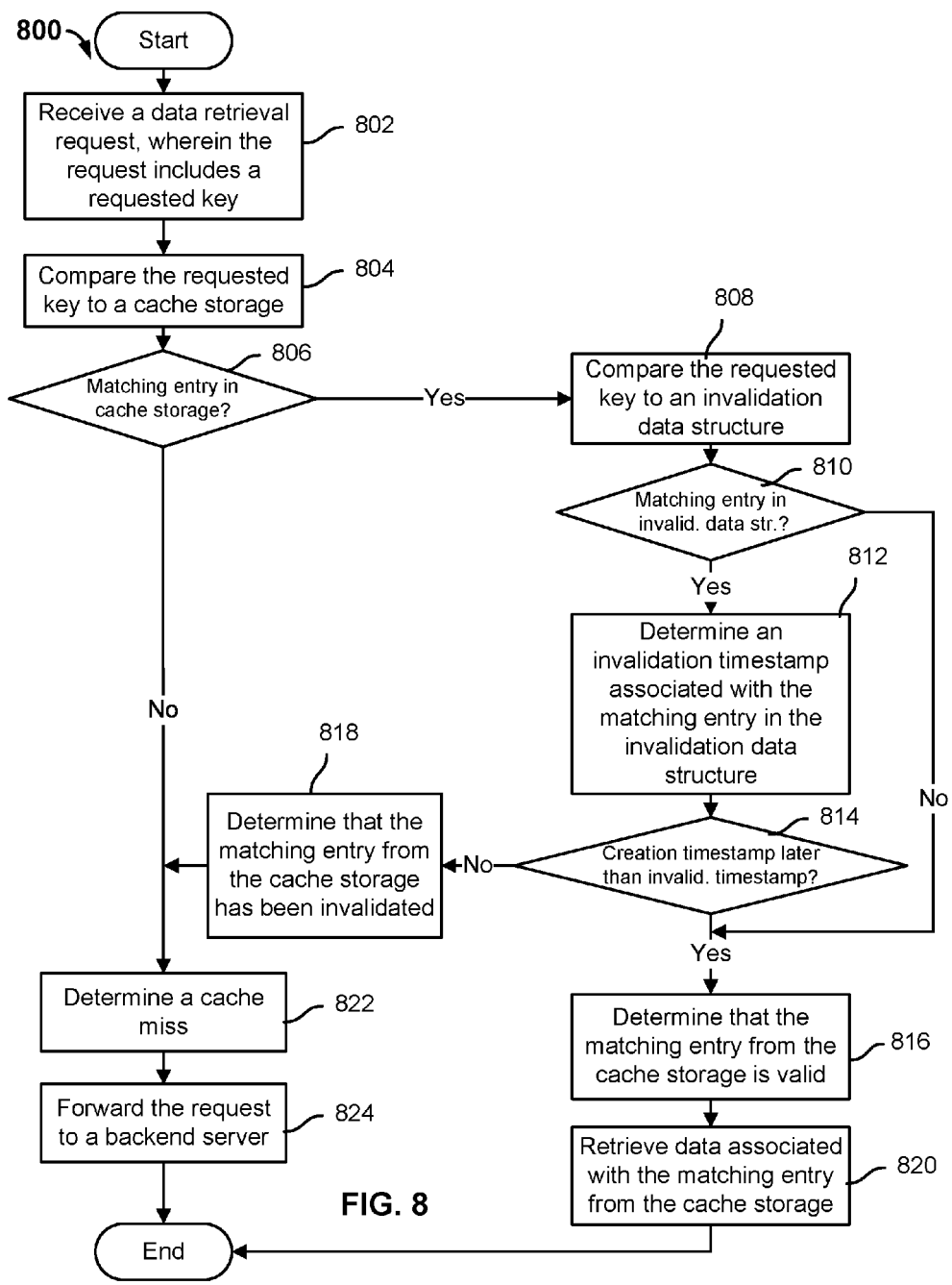
FIG. 8 is a flow diagram showing an example of a process of using an invalidation data structure to determine whether data requested by a data retrieval request has been invalidated.

FIG. 8 is a flow diagram showing an example of a process of using an invalidation data structure to determine whether data requested by a data retrieval request has been invalidated. In some embodiments, process 800 is implemented at system 100 of FIG. 1. In particular, in some embodiments, process 800 is implemented by cache server 108 of system 100 of FIG. 1. In some embodiments, step 408 of process 400 is implemented, at least in part, by process 800.

At 802, a data retrieval request is received, wherein the data retrieval request includes a requested key. In some embodiments, the data retrieval request comprises an API request. In some embodiments, the requested key that is included in the data retrieval request is used to match against the keys of cached data. In some embodiments, the requested key comprises a HTTP request URI.

For example, a data retrieval request includes the requested key of "v2."

At 804, the requested key is compared to a cache storage. The requested key is compared to the keys of the cache entries of the cache storage to determine whether one or more matching cache entries can be found.

At 806, it is determined whether a matching cache entry to the requested key is found in the cache storage. In the event that the requested key matches a matching cache entry in the cache storage, control is transferred to 808. Otherwise, in the event that the requested key does not match a matching cache entry in the cache storage, control is transferred to 822. The cache storage is first checked for whether requested data associated with the data retrieval request is stored in the cache storage. If one or more matching cache entries are found in the cache storage, then it is determined that there is a cache hit. Otherwise, if no matching cache entries are found in the cache storage, then it is determined that there is a cache miss. In some embodiments, any cache entries associated with expired TTLs are either already removed from the cache storage or are not used to compare against the requested key.

Returning to the example above, the requested key of "v2-k1" can be compared to each cache entry of example cache storage table 600 of FIG. 6. The cache entry that includes key "v2-k1" is found in the example cache storage table 600 of FIG. 6.

At 808, the requested key is compared to an invalidation data structure. The requested key is matched against the invalidation patterns of the invalidation entries of an invalidation data structure. For example, an invalidation pattern of an invalidation entry may match at least a portion of the requested key of the data retrieval request.

Returning to the example above, the requested key of "v2-k1" can be compared to each invalidation entry of example invalidation data structure 700 of FIG. 7.

At 810, it is determined whether the requested key matches a matching invalidation entry in the invalidation data structure. In the event that the requested key matches a matching invalidation entry in the invalidation data structure, control is transferred to 812. Otherwise, in the event that the requested key does not match a matching invalidation entry in the invalidation data structure, control is transferred to 816.

In the event that the requested key matches a matching invalidation entry in the invalidation data structure, then it can be determined that the requested data associated with the data retrieval request is stored in the cache storage but is potentially invalidated. As mentioned above, a cache entry that is invalidated may not be immediately removed from the cache storage and may be eventually removed by an asynchronous process. In the event that the requested key does not match a matching invalidation entry in the invalidation data structure, then at 816, the matching cache entry from the cache storage is determined to and at 820, the requested data associated with the matching cache entry is retrieved. Data (e.g., the value portion of the key-value pair) associated with the valid matching cache entry is retrieved from the cache storage and returned in response to the data retrieval request.

Returning to the example above, an invalidation entry of example invalidation data structure 700 of FIG. 7 with the key pattern of "v2" matches the requested key of "v2-k1." As such, it is determined that the requested data associated with the requested key of "v2-k1" is stored in the cache storage and could be either valid or invalidated, will be described below.

At 812, an invalidation timestamp associated with the matching invalidation entry in the invalidation data structure is determined. The invalidation timestamp that is included in the matching invalidation entry in the invalidation data structure is obtained. The invalidation timestamp of the invalidation entry indicates that any data cached in the cache storage whose key matches the invalidation pattern of the invalidation entry and that is cached before (i.e., has an creation timestamp that is earlier than) the invalidation timestamp is invalidated. In the event that multiple invalidation timestamps are included in the matching invalidation entry, the latest invalidation timestamp is obtained.

Returning to the example above, the matching invalidation entry of example invalidation data structure 700 of FIG. 7 with the key pattern of "v2" is associated with the only invalidation timestamp of "9:00 AM."

At 814, it is determined whether the creation timestamp associated with the matching cache entry is later than the invalidation timestamp associated with the matching invalidation entry in the invalidation data structure. In the event that the creation timestamp associated with the matching cache entry is later than the invalidation timestamp associated with the matching invalidation entry in the invalidation data structure, control is transferred to 816. Otherwise, in the event that the creation timestamp associated with the matching cache entry is not later than the invalidation timestamp associated with the matching invalidation entry in the invalidation data structure, control is transferred to 818.

If the creation timestamp associated with the matching cache entry is later than the invalidation timestamp associated with the matching invalidation entry in the invalidation data structure, then it means that the cache entry was created in the cache storage after the invalidation timestamp of the invalidation entry and therefore, the cache entry is not invalidated by the invalidation entry and therefore remains valid and therefore, steps 816 and 820 are executed. As described above, an invalidation entry invalidates cache entries that match the pattern of the invalidation entry and are associated with creation timestamps that are earlier than the invalidation timestamp of the invalidation entry. However, if the creation timestamp associated with the matching cache entry is not later than the invalidation timestamp associated with the matching invalidation entry in the invalidation data structure, then it means that the cache entry was created in the cache storage before or at the invalidation timestamp of the invalidation entry and therefore, at 818, it is determined that the matching cache entry from the cache storage has been invalidated by the invalidation entry. Because the matching cache entry has been invalidated by the invalidation entry, the data associated with the invalidated cache entry is not permitted to be retrieved from the cache storage and it is determined that there is a cache miss.

Returning to the example above, the creation timestamp of the matching cache entry of the example cache storage table 600 of FIG. 6 with the key of "v2-k1" is "8:15 AM" and the invalidation timestamp of the matching invalidation entry of example invalidation data structure 700 of FIG. 7 with the key pattern of "v2" is "9:00 AM." Because the creation timestamp is not later than the invalidation timestamp, then it indicates that the matching cache entry for the data retrieval request is invalidated by the matching invalidation entry. Therefore, data associated with the invalidated matching cache entry cannot be retrieved in response to the data retrieval request.

At 822, a cache miss is determined. As described above, a cache miss is determined either when the requested data associated with the data retrieval request is not found in the cache storage and/or if one or more matching cache entries to the requested data associated with the data retrieval request are determined to be invalidated by one or more invalidation entries stored at the invalidation data structure.

At 824, the data retrieval request is forwarded to a backend server. The data retrieval request for which either no matching cache entry exists at the cache storage or a matching but invalidated cache entry exists in the cache storage is forwarded to the backend server (or another data source) to obtain the requested data.

Figure 9:
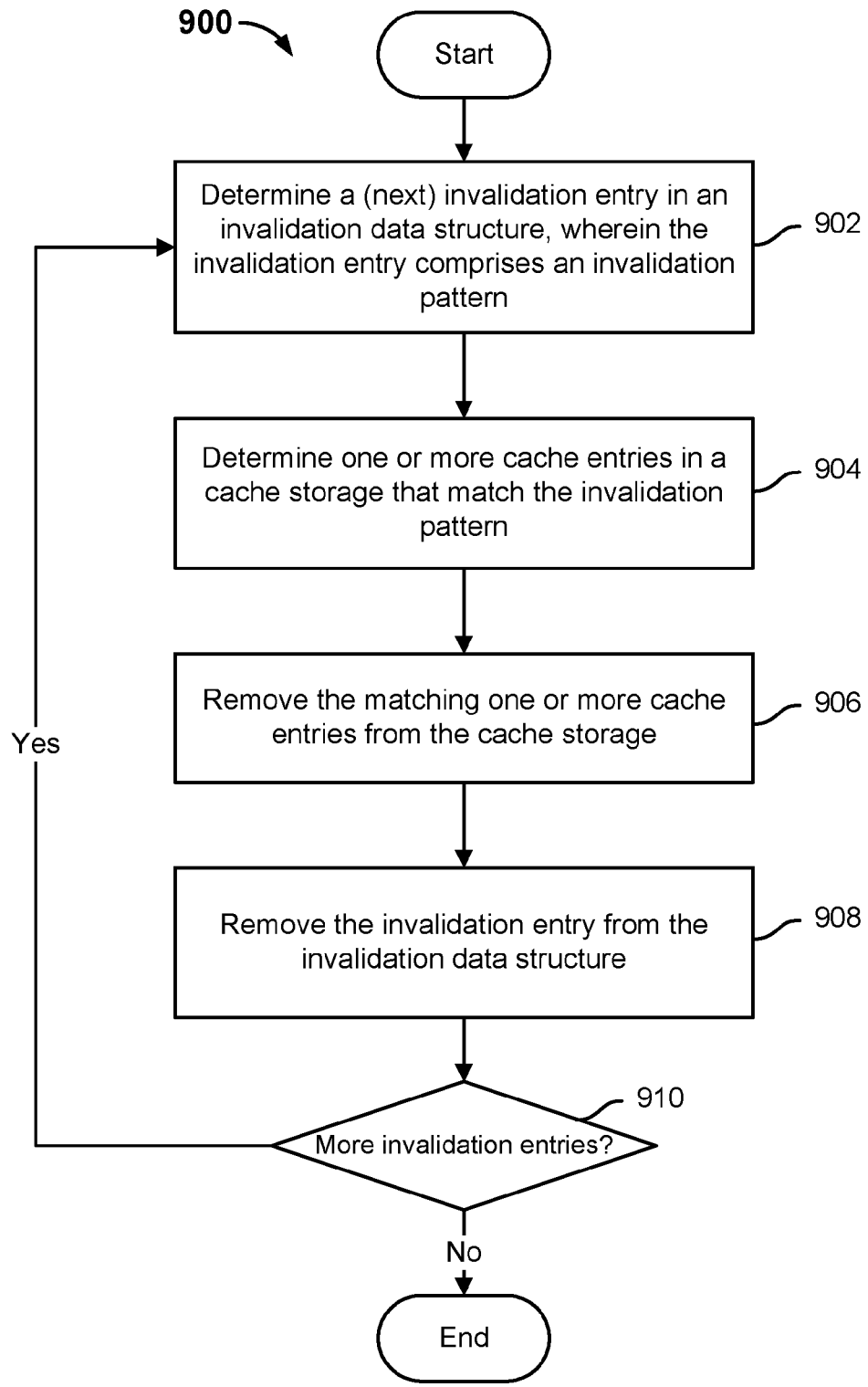
FIG. 9 is a flow diagram showing an example of a process of removing invalidated data from a cache storage using an invalidation data structure.

FIG. 9 is a flow diagram showing an example of a process of removing invalidated data from a cache storage using an invalidation data structure. In some embodiments, process 900 is implemented at system 100 of FIG. 1. In particular, in some embodiments, process 900 is implemented by cache server 108 of system 100 of FIG. 1. In some embodiments, process 900 is performed by an asynchronous process or a thread at every predetermined time interval or in response to an indication configured to trigger the removal of invalidated data.

At 902, a (next) invalidation entry in an invalidation data structure is determined, wherein the invalidation entry comprises an invalidation pattern. An invalidation entry from an invalidation data structure is determined and its invalidation pattern extracted. In some embodiments, the invalidation pattern may be usable to match against keys of cache entries stored at a cache storage to identify cache entries to invalidate. In some other embodiments, the invalidation pattern may be usable to match against data other than keys of cache entries stored at a cache storage to identify cache entries to invalidate.

For example, assume that the invalidation entry under consideration includes the key pattern of "v2" from the example invalidation data structure 700 of FIG. 7.

At 904, one or more cache entries in a cache storage that match the invalidation pattern are determined.

Returning to the above example, the key pattern of "v2" from the example invalidation data structure 700 of FIG. 7 is compared against the keys of the cache entries of the example cache storage table 600 of FIG. 6 and the three cache entries associated with respective keys of "v2-k1," "v2-k2," and "v2-k3" are determined to match the key pattern of "v2." These three matching cache entries are therefore invalidated.

At 906, the matching one or more cache entries are removed from the cache storage. Those cache entries that match the pattern of the invalidation entry are cleared/removed/deleted from the cache storage.

Returning to the above example, the three invalidated cache entries associated with respective keys of "v2-k1," "v2-k2," and "v2-k3" that match the key pattern of "v2" are removed from the cache storage.

At 908, the invalidation entry is removed from the invalidation data structure. After the matching cache entries are confirmed to have been removed from the cache storage, the invalidation entry itself is cleared/removed/deleted from the invalidation data structure.

At 910, it is determined whether there is at least one more invalidation entry left in the invalidation data structure. In the event that there is at least one more invalidation entry left in the invalidation data structure, control is returned to 902, at which the next invalidation entry in the invalidation data structure is considered. Otherwise, in the event that there are no more invalidation entries left in the invalidation data structure, process 900 ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a cache storage configured to store cache entries; and
a processor coupled to the cache storage and configured to:
receive an invalidation request to invalidate one or more invalidated cache entries at the cache storage:
determine whether an invalidation pattern included in the invalidation request matches an invalidation pattern associated with an existing invalidation entry of an invalidation data structure;
in the event that the invalidation pattern included in the invalidation request matches the invalidation pattern associated with the existing invalidation entry of the invalidation data structure, update the existing invalidation entry with an invalidation timestamp included in the invalidation request; and
in the event that the invalidation pattern included in the invalidation request does not match invalidation patterns associated with existing invalidation entries of the invalidation data structure, generate a new invalidation entry in the invalidation data structure with the invalidation pattern and the invalidation timestamp included in the invalidation request.

2. The system of claim 1, wherein the invalidation pattern included in the invalidation request is usable to identify the one or more invalidated cache entries of the cache storage.

3. The system of claim 1, wherein the invalidation pattern included in the invalidation request comprises one or more of the following: a key, value, and creation time information.

4. The system of claim 1, wherein the processor is further configured to receive a data retrieval request for a requested cache entry at the cache storage.

5. The system of claim 4, wherein the processor is further configured to use the invalidation data structure to determine whether the requested cache entry has been invalidated, comprising to:
determine that a requested key included in the data retrieval request matches a matching cache entry in the cache storage;
determine that the requested key matches a matching invalidation entry in the invalidation data structure;
determine whether a creation timestamp associated with the matching cache entry is later than an invalidation timestamp associated with the matching invalidation entry:
in the event that the creation timestamp associated with the matching cache entry is later than the invalidation timestamp associated with the matching invalidation entry:
determine that the matching cache entry is valid; and
return data associated with the matching cache entry;
in the event that the creation timestamp associated with the matching cache entry is not later than the invalidation timestamp associated with the matching invalidation entry:
determine that the matching cache entry is invalidated; and
forward the data retrieval request to a backend server.

6. The system of claim 5, wherein to determine whether the creation timestamp associated with the matching cache entry is later than the invalidation timestamp associated with the matching invalidation entry comprises to determine a latest invalidation timestamp of a plurality of invalidation timestamps associated with the matching invalidation entry.

7. The system of claim 5, wherein to determine that the requested key included in the data retrieval request matches the matching cache entry in the cache storage comprises to compare the requested key to cache entries in the cache storage other than those cache entries associated with expired time to live (TTL) values.

8. The system of claim 5, wherein the processor is further configured to use the invalidation data structure to determine whether the requested cache entry has been invalidated comprises to:
determine that a requested key included in the data retrieval request matches a matching cache entry in the cache storage:
determine that the requested key does not match a matching invalidation entry in the invalidation data structure;
determine that the matching cache entry is valid; and
return data associated with the matching cache entry.

9. The system of claim 1, wherein a cache entry in the cache storage comprises a key-value pair and a creation timestamp.

10. The system of claim 1, wherein the processor is further configured to:
obtain requested data from a backend server;
determine to cache the requested data based at least in part on a caching policy; and
write the requested data as one or more cache entries in the cache storage with corresponding creation time information.

11. The system of claim 1, wherein the processor is further configured to:
determine an invalidation entry in the invalidation data structure, wherein the invalidation entry comprises an invalidation pattern;

determine one or more cache entries in the cache storage that match the invalidation pattern;

remove the matching one or more cache entries from the cache storage; and remove the invalidation entry from the invalidation data structure.

12. The system of claim 1, wherein the invalidation request is generated in response to a user input received at a backend server.

13. The system of claim 1, wherein the cache storage and the invalidation data structure are stored in a same storage.

14. The system of claim 1, wherein the cache storage is stored in a first storage and the invalidation data structure are stored in a second storage.

15. The system of claim 14, wherein the first storage comprises hard disk and the second storage comprises memory.

16. A method, comprising:

receiving an invalidation request to invalidate one or more invalidated cache entries at a cache storage:

determining whether an invalidation pattern included in the invalidation request matches an invalidation pattern associated with an existing invalidation entry of an invalidation data structure;

in the event that the invalidation pattern included in the invalidation request matches the invalidation pattern associated with the existing invalidation entry of the invalidation data structure, updating the existing invalidation entry with an invalidation timestamp included in the invalidation request; and in the event that the invalidation pattern included in the invalidation request does not match invalidation patterns associated with existing invalidation entries of the invalidation data structure, generating a new invalidation entry in the invalidation data structure with the invalidation pattern and the invalidation timestamp included in the invalidation request.

17. The method of claim 16, further comprising receiving a data retrieval request for a requested cache entry at the cache storage.

18. The method of claim 17, further comprising using the invalidation data structure to determine whether the requested cache entry has been invalidated, comprising:

determining that a requested key included in the data retrieval request matches a matching cache entry in the cache storage;

determining that the requested key matches a matching invalidation entry in the invalidation data structure;

determining whether a creation timestamp associated with the matching cache entry is later than an invalidation timestamp associated with the matching invalidation entry:

in the event that the creation timestamp associated with the matching cache entry is later than the invalidation timestamp associated with the matching invalidation entry:

determining that the matching cache entry is valid; and returning data associated with the matching cache entry;

in the event that the creation timestamp associated with the matching cache entry is not later than the invalidation timestamp associated with the matching invalidation entry:

determining that the matching cache entry is invalidated; and forwarding the data retrieval request to a backend server.

19. The method of claim 17, further comprising using the invalidation data structure to determine whether the requested cache entry has been invalidated, comprising:

determining that a requested key included in the data retrieval request matches a matching cache entry in the cache storage:

determining that the requested key does not match a matching invalidation entry in the invalidation data structure;

determining that the matching cache entry is valid; and returning data associated with the matching cache entry.

20. The method of claim 16, further comprising:

determine an invalidation entry in the invalidation data structure, wherein the invalidation entry comprises an invalidation pattern;

determine one or more cache entries in the cache storage that match the invalidation pattern;

remove the matching one or more cache entries from the cache storage; and remove the invalidation entry from the invalidation data structure.

21. A computer program product, the computer program product being embodied in a non-transitory computer readable storage medium and comprising computer instructions for:

receiving an invalidation request to invalidate one or more invalidated cache entries at a cache storage:

determining whether an invalidation pattern included in the invalidation request matches an invalidation pattern associated with an existing invalidation entry of an invalidation data structure;

in the event that the invalidation pattern included in the invalidation request matches the invalidation pattern associated with the existing invalidation entry of the invalidation data structure, updating the existing invalidation entry with an invalidation timestamp included in the invalidation request; and in the event that the invalidation pattern included in the invalidation request does not match invalidation patterns associated with existing invalidation entries of the invalidation data structure, generating a new invalidation entry in the invalidation data structure with the invalidation pattern and the invalidation timestamp included in the invalidation request.

* * * * *